(12) United States Patent
Otani (10) Patent No.: US 7,450,214 B2
(45) Date of Patent: Nov. 11, 2008

(54) METHOD OF MANUFACTURING LIQUID CRYSTAL DISPLAY APPARATUS AND LIQUID CRYSTAL DRIPPING APPARATUS

(75) Inventor: Minoru Otani, Kawasaki (JP)

(73) Assignees: Fujitsu Limited, Kawasaki (JP); AU Optronics Corporation (TW)

(*) Notice: Subject to any disclaimer, the term of this patent is extended or adjusted under 35 U.S.C. 154(b) by 0 days.

(21) Appl. No.: 11/983,068

(22) Filed: Nov. 7, 2007

(65) Prior Publication Data

US 2008/0068554 A1    Mar. 20, 2008

Related U.S. Application Data

(62) Division of application No. 11/025,868, filed on Dec. 29, 2004.

(30) Foreign Application Priority Data

Sep. 17, 2004  (JP) .............................. 2004-271585

(51) Int. Cl.
  *G02F 1/1341* (2006.01)
  *G02F 1/1339* (2006.01)
(52) U.S. Cl. ...................... 349/189; 349/190
(58) Field of Classification Search ................. 349/189, 349/190
  See application file for complete search history.

(56) References Cited

U.S. PATENT DOCUMENTS 5,263,888 A   11/1993  Ishihara et al.
6,238,754 B1 * 5/2001  Shohara et al. .............. 428/1.5
7,102,726 B2   9/2006  Byun et al.
7,199,855 B2 * 4/2007  Yoshimi et al. ............. 349/187
2004/0160566 A1  8/2004  Kawabe et al.
2004/0207800 A1 10/2004  Hiruma et al.
2004/0241317 A1 12/2004  Jung et al.
2006/0260543 A1 11/2006  Hiruma et al.

FOREIGN PATENT DOCUMENTS

| CN | 1475313 | 2/2004 |
| JP | 5-232481 | 9/1993 |
| JP | A 5-281557 | 10/1993 |
| JP | A 9-59626 | 3/1997 |
| JP | A 9-311340 | 12/1997 |
| JP | 2002-258299 | 9/2002 |

* cited by examiner

*Primary Examiner*—David Nelms
*Assistant Examiner*—David Y Chung
(74) *Attorney, Agent, or Firm*—Greer, Burns & Crain, Ltd.

(57) ABSTRACT

The step of putting drops of liquid crystal onto a substrate includes the putting of drops of liquid crystal onto the substrate at spaced intervals of 15 mm or less. Thus, an impurity concentration is made equal to or less than 30 ppm in a region in which the liquid crystals collide with each other when the bonding of the substrates causes diffusion of the liquid crystals through a liquid crystal cell. A liquid crystal dripping apparatus including a branch nozzle having a plurality of discharge openings is used in the step of putting drops of liquid crystal onto the substrate. By a single dispensing operation, the apparatus simultaneously puts drops of liquid crystal onto a plurality of spots on the substrate.

3 Claims, 10 Drawing Sheets

METHOD OF MANUFACTURING LIQUID CRYSTAL DISPLAY APPARATUS AND LIQUID CRYSTAL DRIPPING APPARATUS

CROSS-REFERENCE TO RELATED APPLICATIONS

This application is a divisional of U.S. patent application Ser. No. 11/025,868, filed Dec. 29, 2004, which is based on and claims priority of Japanese Patent Application No. 2004-271585 filed on Sep. 17, 2004, the entire contents of which are incorporated herein by reference.

BACKGROUND OF THE INVENTION

1. Field of the Invention

The present invention relates to a method of manufacturing a liquid crystal display apparatus and a liquid crystal dripping apparatus, and more particularly to a method of manufacturing a liquid crystal display apparatus, in which One Drop Fill method is used to feed liquid crystal to a substrate, and a liquid crystal dripping apparatus for use in the manufacturing method.

2. Description of the Prior Art

Recently, liquid crystal display apparatuses have been used for various applications, in that the display apparatuses are characterized by being thin and lightweight and also being capable of low-voltage drive, thus exhibiting low power consumption. Such widespread demands increase the variety of requests for liquid crystal display apparatuses. Of these requests, there are strong requests for improved display capabilities and lower costs.

Generally, a liquid crystal display apparatus has a basic configuration including a TFT (thin film transistor) substrate having a picture element electrode, a TFT, and the like, which are disposed thereon; an opposite substrate having an opposite electrode, a color filter, a spacer, and the like, which are disposed thereon; and liquid crystal sealed in between the TFT substrate and the opposite substrate.

Methods for injecting liquid crystal to be sealed in between the TFT substrate and the opposite substrate include vacuum injection and One Drop Fill (hereinafter referred to simply as "ODF" method). The ODF has the advantage of allowing a short processing time, and can achieve stable display capabilities and high productivity, as compared to the vacuum injection.

The description will be given below with regard to a method of using the ODF to inject liquid crystal to be sealed in between the TFT substrate and the opposite substrate. In the ODF, the following processes take place. First, the TFT substrate is cleaned, then the TFT substrate is coated with a polyimide film by printing technique, and then the polyimide film is cured to obtain an alignment layer. An alignment layer is also formed on the opposite substrate in the same manner.

Then, a sealant is selectively formed around a display area on the TFT substrate.

Figure 1:
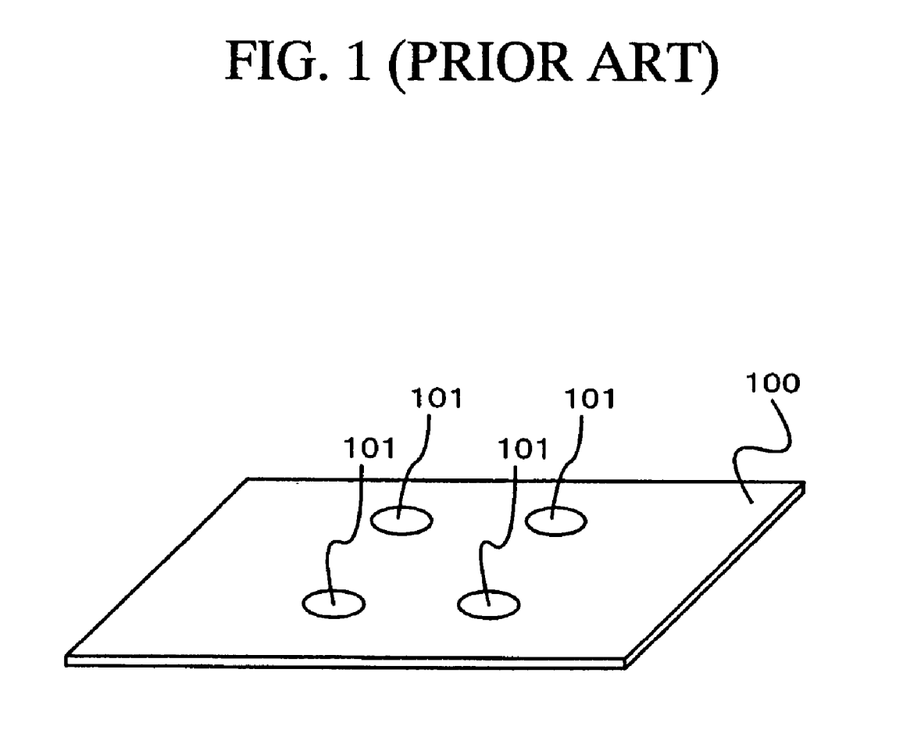
FIG. 1 illustrates an example of the arrangement of drops of liquid crystals in the prior art, which are put onto a substrate.

Then, a dispenser is controlled to dispense liquid crystal onto the TFT substrate through its nozzle, and thereby to put a drop of liquid crystal onto the TFT substrate. The dispenser is further controlled to travel a predetermined distance and thus to move to another drop-feed point, at which the dispenser again dispenses liquid crystal through its nozzle. Repetition of the above-mentioned operation yields a TFT substrate 100 having liquid crystals 101 arranged thereon in a grid pattern at predetermined spaced intervals, as shown in FIG. 1.

In a vacuum atmosphere, the TFT substrate and the opposite substrate are then bonded together in alignment with each other by the sealant. Thus, the liquid crystals put on the TFT substrate spread through a space enclosed with the TFT substrate, the opposite substrate, and the sealant. Incidentally, the spacer disposed on the opposite substrate maintains a given gap between the TFT substrate and the opposite substrate. The liquid crystals are sealed in between the TFT substrate and the opposite substrate in the manner as above described.

The method of using the ODF to inject liquid crystal, as mentioned above, is disclosed in Japanese Unexamined Patent Application Publication No. Hei 05 (1993)-232481, for example.

However, a problem may arise in a liquid crystal display apparatus filled with liquid crystal by using the ODF as mentioned above. Specifically, when the driving of the display allows a display image to appear, unevenness in brightness (i.e. light and shade) may develop in a grid pattern in a region in which the liquid crystals collide with each other when the liquid crystals are horizontally diffused between the substrates.

SUMMARY OF THE INVENTION

The present invention is designed to overcome the foregoing problem. It is an object of the present invention to provide a method of manufacturing a liquid crystal display apparatus to be filled with liquid crystal by using One Drop Fill method, in which the method of manufacturing a liquid crystal display apparatus which prevents the occurrence of unevenness in brightness and thus has display capabilities superior to conventional liquid crystal display apparatuses is adopted, and to provide a liquid crystal dripping apparatus for use in the manufacturing method.

To solve the above problem, a method of manufacturing a liquid crystal display apparatus of the present invention comprises the steps of: preparing a pair of substrates to form the liquid crystal display apparatus; putting drops of liquid crystal onto a plurality of spots on one of the substrates which form the pair; and bonding together the one substrate and the other substrate, thereby diffusing the liquid crystals while sealing the liquid crystals in between the pair of substrates. In the method, an impurity concentration is made equal to or less than 30 ppm in a region in which the liquid crystals collide with each other when the liquid crystals are diffused.

Furthermore, to solve the above problem, a liquid crystal dripping apparatus of the present invention comprises: a stage on which a substrate is placed; a dispenser which is disposed over the stage and is filled with liquid crystal, the dispenser being capable of controlling the amount of the liquid crystal dispensed; and a nozzle which is mounted to the bottom of the dispenser so that the liquid crystal is dispensed through the nozzle. In the apparatus, the nozzle has a plurality of discharge openings on its end to discharge the liquid crystal.

The inventors of this application have made intensive research to prevent unevenness in brightness from appearing in a grid pattern on a display screen during the driving of the liquid crystal display apparatus filled with liquid crystal by using the ODF. As a result, the inventors have found out that unevenness in brightness does not appear in situations where the impurity concentration is equal to or less than 30 ppm in the region in which the liquid crystals collide with each other, when the drops of liquid crystals put onto a plurality of spots on the substrate are diffused through a liquid crystal cell by the bonding of the one substrate and the other.

In the method of manufacturing a liquid crystal display apparatus of the present application, the step of putting drops of liquid crystal onto the substrate includes the putting of drops of the liquid crystal onto the substrate at spaced intervals of 15 mm or less. Thus, a small amount of impurities is captured in the liquid crystals until the liquid crystals collide with each other when the liquid crystals are diffused. Therefore, the impurity concentration can be made equal to or less than 30 ppm in the region in which the liquid crystals collide with each other.

However, when drops of liquid crystal are put onto the substrate at spaced intervals of 15 mm or less, this may increase the number of putting a drop of liquid crystal onto the substrate, thus increasing the processing time. In this case, it is also necessary to reduce the amount of liquid crystal fed at a time, and thus it becomes difficult to control the dispenser.

Thus, the inventors of this application have designed a liquid crystal dripping apparatus including a dispenser capable of controlling the amount of liquid crystal dispensed, and a nozzle which is connected to the dispenser and has a plurality of discharge openings on its end to discharge the liquid crystal. The liquid crystal dripping apparatus can simultaneously put drops of liquid crystal onto a plurality of spots on the substrate. Therefore, the apparatus can reduce the number of putting drops of liquid crystal onto the substrate, even when drops of liquid crystal are put onto the substrate at short spaced intervals. Moreover, the dispenser can be easily controlled, because the amount of liquid crystal dispensed from the dispenser at a time is not reduced even when the amount of liquid crystal discharged through each discharge opening of the nozzle is reduced. As described above, the liquid crystal dripping apparatus facilitates implementation of the method of manufacturing a liquid crystal display apparatus according to the present application.

BRIEF DESCRIPTION OF THE DRAWINGS

FIGS. 2A and 2B are illustrations of assistance in explaining causes of the occurrence of unevenness in brightness in a grid pattern.

FIGS. 3A and 3B are illustrations of assistance in explaining the principle of preventing the occurrence of unevenness in brightness in a grid pattern according to the present invention.

FIGS. 5A and 5B are illustrations (2) showing the method of manufacturing a liquid crystal display apparatus according to the first embodiment of the present invention.

DESCRIPTION OF THE PREFERRED EMBODIMENTS

Prior to the description of embodiments of the present invention, the description will be given with regard to causes of the occurrence of unevenness in brightness in a grid pattern in a liquid crystal display apparatus filled with liquid crystal by using One Drop Fill method.

As a result of intensive research on the liquid crystal display apparatus filled with liquid crystal by using the ODF, the inventors of this application have found out that occurrence of unevenness in brightness in a grid pattern results from a nonuniform distribution of impurities in a liquid crystal cell. Incidentally, the impurity is a phthalic acid derivative such as diethyl phthalate. Besides the phthalic acid derivative, a chemical substance having higher polarity is more likely to cause the occurrence of unevenness in brightness.

Figure 2A:
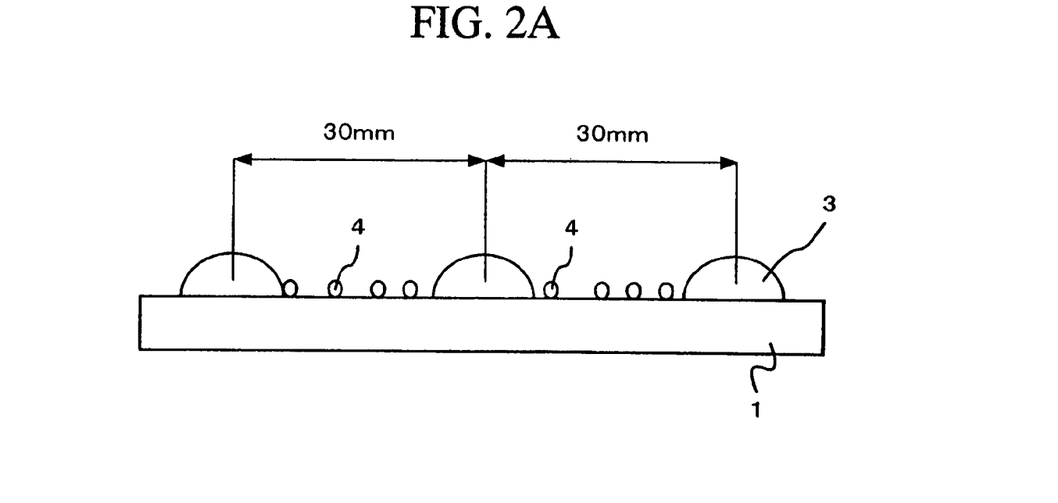
FIG. 2A illustrates the distribution of impurities on a substrate yet to be bonded and the arrangement of liquid crystals thereon.
Figure 2B:
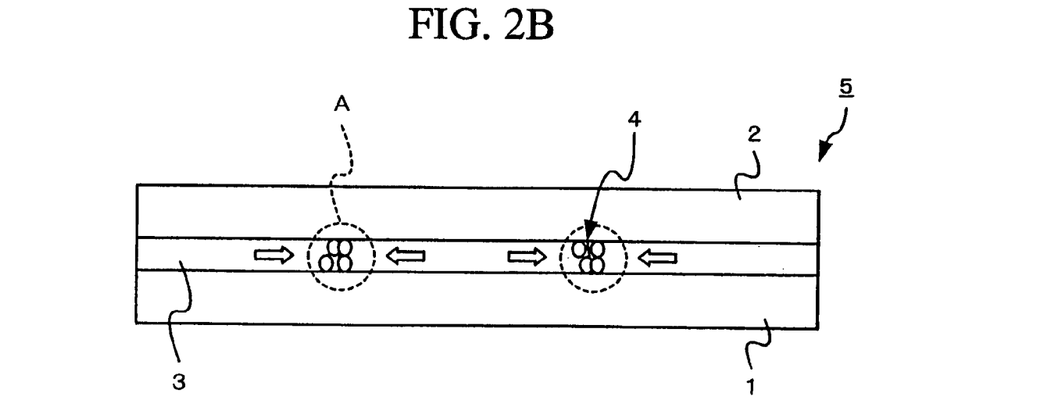
FIG. 2B illustrates the distribution of impurities, which occurs after the substrates have been bonded together.

A specific example is as follows. As shown in FIG. 2A, impurities 4 adhere to a substrate 1 yet to be bonded in a nearly uniform distribution. Drops of liquid crystals 3 are put onto the substrate 1 at given spaced intervals (e.g. spaced intervals of 30 mm in FIG. 2A). As shown in FIG. 2B, when the substrates 1 and 2 are bonded together, the liquid crystals 3 put on the substrate 1 spread through the space in a liquid crystal cell 5. The impurities 4 on the substrate are captured in the liquid crystals 3 and migrate in the spreading direction of the liquid crystals 3, so that the impurities 4 are gathered in regions A in which the liquid crystals 3 collide with each other. Consequently, parts having the impurities 4 gathered therein, that is, parts having high impurity concentrations, develop in a grid pattern in the liquid crystal cell 5. When the liquid crystal display apparatus is driven, the parts having high impurity concentrations and the other parts having low impurity concentrations lead to nonuniformity in a retention and residual DC in the liquid crystal cell 5, so that unevenness in brightness appears in a grid pattern on a display screen.

Thus, a complete elimination of the impurities on the substrate may prevent the occurrence of variations in impurity concentration in the liquid crystal cell and thus prevent the occurrence of unevenness in brightness. However, the complete elimination of the impurities on the substrate is extremely difficult. This difficulty cannot be resolved, even when the substrate cleaning time is increased or the time for allowing the substrate to stand is minimized.

Thus, the inventors of this application have directed attention to spaced intervals at which drops of liquid crystal are put onto the substrate, based on the idea of lowering impurity concentrations in the parts having high impurity concentrations, thus reducing variations in impurity concentration between the parts having high impurity concentrations and the parts having low impurity concentrations, and thereby controlling the occurrence of unevenness in brightness.

Figure 3A:
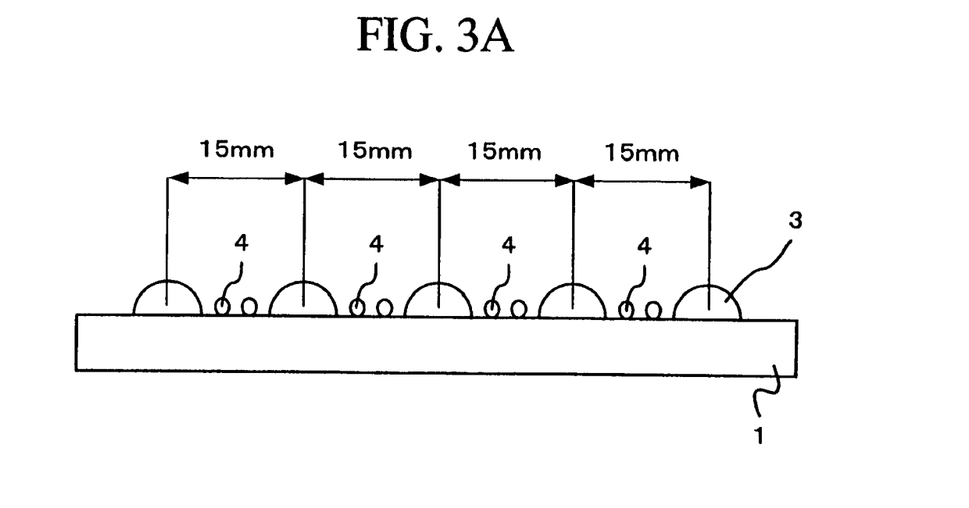
FIG. 3A illustrates the distribution of impurities on the substrate yet to be bonded and the arrangement of liquid crystals thereon.
Figure 3B:
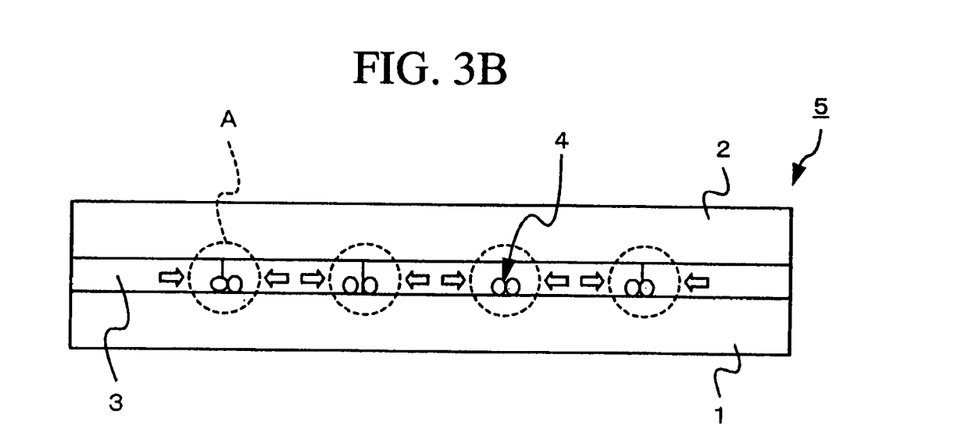
FIG. 3B illustrates the distribution of impurities, which occurs after the substrates have been bonded together.

A specific example is as follows. As shown in FIG. 3A, when drops of liquid crystal are put onto the substrate at short spaced intervals, the drops of liquid crystals 3 put onto the substrate 1 come to be located at short spaced intervals (e.g. spaced intervals of 15 mm in FIG. 3A). Thus, as shown in FIG. 3B, when the bonding of the substrates 1 and 2 allows the liquid crystals 3 to spread through the liquid crystal cell 5, a small amount of impurities 4 is captured in the liquid crystals 3 until the liquid crystals 3 collide with each other, so that a small amount of impurities 4 is gathered in the regions A in which the liquid crystals collide with each other. As a result, the parts having impurities 4 gathered therein have low impurity concentrations, so that unevenness in brightness is prevented from appearing when the liquid crystal display apparatus is driven.

Therefore, the inventors of this application have carried out an experimental test to see whether or not there is unevenness in brightness in a grid pattern when drops of liquid crystal are put onto the substrate at various spaced intervals. The results of the test are shown in Table 1.

TABLE 1

| Spaced intervals at which drops of liquid crystal are put onto substrate | Presence/absence of unevenness in brightness in grid pattern | Remarks |
|---|---|---|
| 50 mm | Present | Cell has varying thicknesses |
| 30 mm | Present | Unevenness in brightness has a width of about 5 mm |
| 20 mm | Present | Unevenness in brightness has a width of about 3.5 mm |
| 15 mm | Absent | |
| 10 mm | Absent | |

As shown in Table 1, unevenness in brightness appeared in a grid pattern when drops of liquid crystal were put onto the substrate at spaced intervals of more than 15 mm. Unevenness in brightness did not appear when drops of liquid crystal were put onto the substrate at spaced intervals of 15 mm or less. The unevenness in brightness had a width of about 5 mm when drops of liquid crystal were put onto the substrate at spaced intervals of 30 mm. The unevenness in brightness had a width of about 3.5 mm when drops of liquid crystal were put onto the substrate at spaced intervals of 20 mm.

It is clear from the test results that, when drops of liquid crystal are put onto the substrate at shorter spaced intervals, unevenness in brightness is less likely to appear in a grid pattern or has a narrower width if the unevenness in brightness appears. In other words, it may be said that unevenness in brightness appears when the impurity concentration in the region in which the liquid crystals collide with each other, which is attributed to spaced intervals at which drops of liquid crystal are put onto the substrate, is higher than a given value.

However, it is difficult to measure an impurity concentration in a specific region in the liquid crystal cell, because the impurities in the liquid crystal cell are not dissolved in the liquid crystals but lie on the interface between the liquid crystals and the substrate.

Thus, the inventors of this application have performed measurement and calculation as given below. Measurement was previously performed to obtain the total amount of impurities (i.e. the impurity concentration) on the substrate yet to be bonded. Then, calculation was performed to obtain the impurity concentration in the region in which the liquid crystals collide with each other when the bonding of the substrates allows the liquid crystals to spread through the liquid crystal cell, provided that drops of liquid crystal are put onto the substrate at various spaced intervals (each of which corresponds to the distance between neighboring liquid crystals put on the substrate). The impurity concentration in the region in which the liquid crystals collide with each other is expressed as the following equation:

$$(\text{the impurity concentration}) = (A*B*c)/r*(A+B-r)$$

where A denotes the distance (mm) between neighboring liquid crystals as viewed in a transverse direction (i.e., a horizontal direction of the substrate surface), B denotes the distance (mm) between neighboring liquid crystals as viewed in a longitudinal direction (i.e., a vertical direction of the substrate surface), c denotes the impurity concentration (ppm) of the impurities which adhere to the substrate yet to be bonded, and r denotes the width (mm) of unevenness in brightness.

First, the impurity concentration on the substrate yet to be bonded was measured and found to be about 10 ppm in the liquid crystal cell region. Then, the above equation was used to calculate the impurity concentration in the region in which the liquid crystals collide with each other, based on the result of measurement. As a result, the calculated impurity concentration of 37.2 ppm was obtained when the transverse and longitudinal distances between neighboring liquid crystals were each equal to 30 mm. The calculated impurity concentration of 31.3 ppm was obtained when the transverse and longitudinal distances between neighboring liquid crystals were each equal to 20 mm. Although unevenness in brightness did not appear when the transverse and longitudinal distances between neighboring liquid crystals were each equal to 15 mm, the impurity concentration was calculated on the assumption that unevenness in brightness appeared with a width of 3 mm. As a result, the calculated impurity concentration of 27.8 ppm was obtained.

According to the results of calculations, it may be said that the threshold value of the impurity concentration, which causes the occurrence of unevenness in brightness, is about 30 ppm. In other words, it may be said that unevenness in brightness does not appear when the relationship $(A*B*c)/r*(A+B-r) \leq 30$ (ppm) is satisfied.

As mentioned above, the factors that cause the occurrence of unevenness in brightness include the amount of impurities on the substrate, the distance between neighboring liquid crystals, and the width of unevenness in brightness. Of these factors, the width of unevenness in brightness changes according to the manufacturing conditions for the liquid crystal display apparatus, and so on. Moreover, the complete elimination of the impurities on the substrate is extremely difficult. However, the amount of impurities on the substrate is substantially fixed under stable manufacturing conditions. It may be therefore said that the most effective way of preventing the occurrence of unevenness in brightness is to reduce the distance between neighboring liquid crystals, that is, to reduce spaced intervals at which drops of liquid crystal are put onto the substrate. According to the test results shown in Table 1, unevenness in brightness does not appear when drops of liquid crystal are put onto the substrate at spaced intervals of 15 mm or less.

First Embodiment

A first embodiment of the present invention will be described below with reference to the accompanying drawings.

FIGS. 4 to 10 illustrate a method of manufacturing a liquid crystal display apparatus according to the first embodiment of the present invention. The description will be given herein with regard to a method of manufacturing an MVA (multi-domain vertical alignment) liquid crystal display apparatus as an example.

After two glass substrates have been prepared, a gate bus line, a data bus line, a TFT, a picture element electrode made of a transparent conductive material such as ITO (Indium-Tin Oxide), and the like are formed on one glass substrate which is to form a TFT substrate. Then, the glass substrate is cleaned, and then a polyimide solution is applied to the glass substrate by printing technique so as to form an alignment layer. Then, prebaking takes place at a temperature of 80 degrees C. for 1 minute, and then, baking takes place at a temperature of 190 degrees C. for 10 minutes, thereby curing the alignment layer. The TFT substrate is completed in the above-described manner.

A color filter, a common electrode made of a transparent conductor such as ITO, a projection for defining a domain, a pillar spacer for keeping a given cell gap, and the like are formed on the other glass substrate which is to form an opposite substrate. Then, the glass substrate is cleaned, and then a polyimide solution is applied to the glass substrate by printing technique so as to form an alignment layer. Then, prebaking and baking take place under the same conditions as in the case of the TFT substrate, thereby curing the alignment layer. The opposite substrate is completed in the above-described manner.

Figure 4:
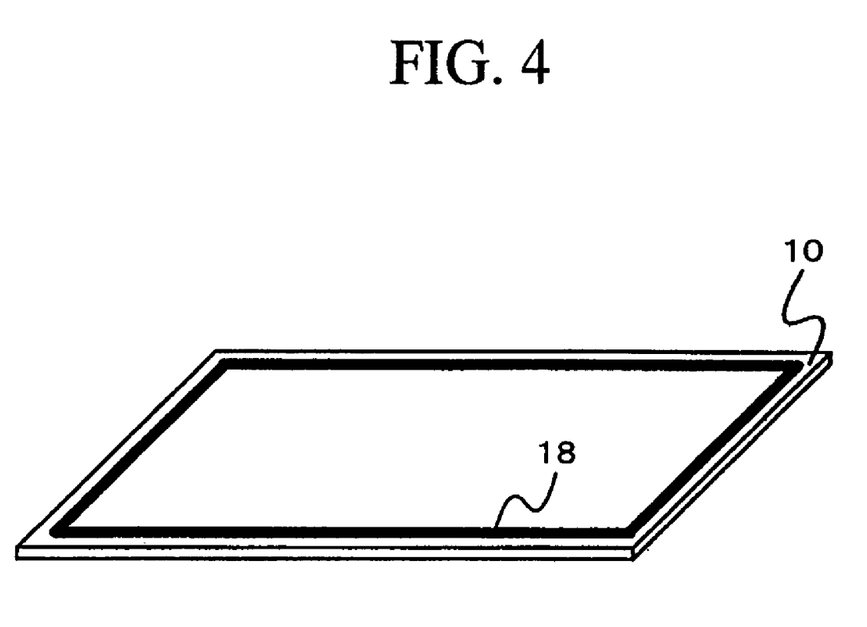
FIG. 4 is an illustration (1) showing a method of manufacturing a liquid crystal display apparatus according to a first embodiment of the present invention.

Then, a TFT substrate 10 is coated with an ultraviolet-curing resin (i.e., a sealant) so that a seal 18 is formed around a display area of the liquid crystal display apparatus, as shown in FIG. 4.

Figure 5A:
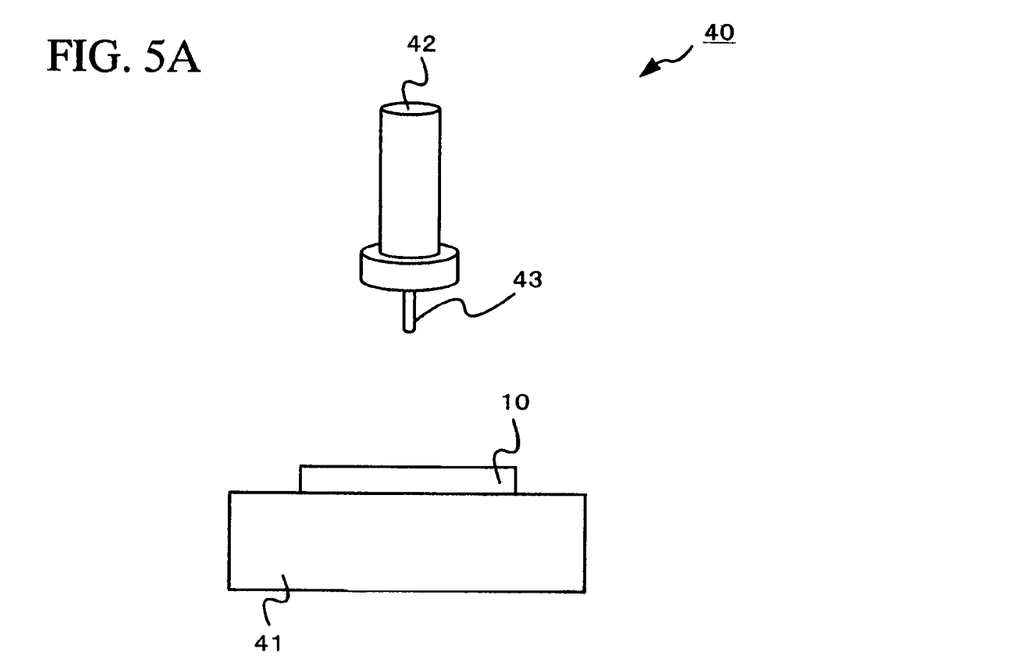
FIG. 5A illustrates a liquid crystal dripping apparatus and a substrate as placed on a stage of the apparatus.
Figure 5B:
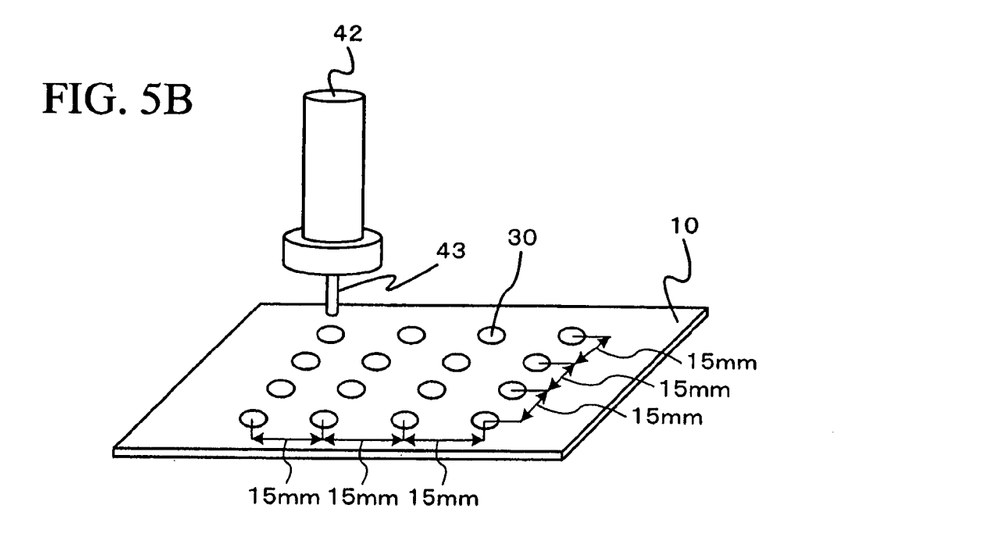
FIG. 5B illustrates the arrangement of drops of liquid crystals put onto the substrate.

Then, drops of vertical alignment liquid crystal 30 are put onto the TFT substrate 10 in the following manner. As shown in FIG. 5A, the TFT substrate 10 is first placed on a stage 41 of a liquid crystal dripping apparatus 40. Then, a precision dispenser 42 is controlled to dispense, through its nozzle 43, 0.5 mg of liquid crystal 30 onto the TFT substrate 10 within an area having the seal 18 formed thereon, thereby putting a drop of liquid crystal 30 onto the TFT substrate 10. After the completion of a single dispensing operation, the precision dispenser 42 is controlled to travel a distance of 15 mm in the transverse direction (i.e. the horizontal direction of the surface of the TFT substrate 10) and thus to move to another drop-feed point, at which the precision dispenser 42 again dispenses 0.5 mg of liquid crystal 30. After the completion of feeding of a horizontal row of drops of liquid crystal, the precision dispenser 42 is controlled to travel a distance of 15 mm in the longitudinal direction (i.e. the vertical direction of the surface of the TFT substrate 10) and thus to move to another drop-feed point. Then, the precision dispenser 42 again puts drops of liquid crystal onto the TFT substrate 10 in the transverse direction. Repetition of the above-mentioned operation yields the TFT substrate 10 having the liquid crystals 30 arranged thereon in a grid pattern at spaced intervals of 15 mm, as shown in FIG. 5B. Incidentally, the seal 18 is not shown in FIG. 5B.

Figure 6:
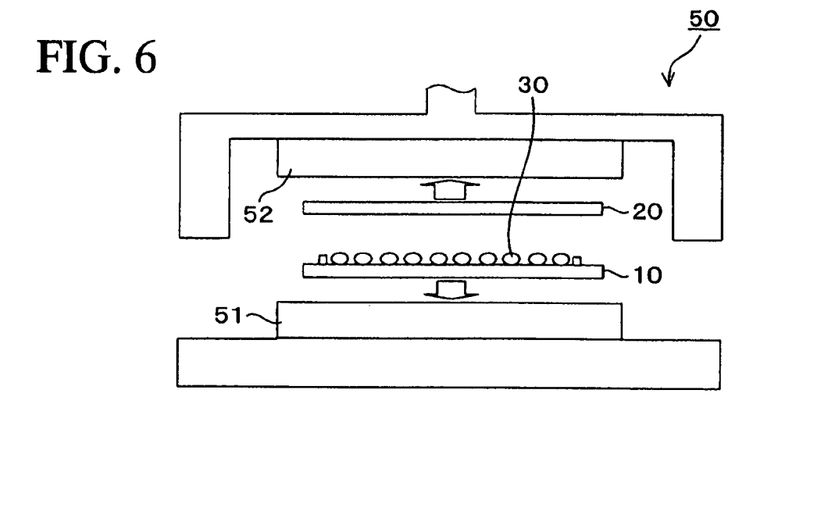
FIG. 6 is an illustration (3) showing the method of manufacturing a liquid crystal display apparatus according to the first embodiment of the present invention.

Then, as shown in FIG. 6, the TFT substrate 10 is mounted on a lower platen 51 of a bonding apparatus 50, and an opposite substrate 20 is mounted to an upper platen 52 thereof.

Figure 7:
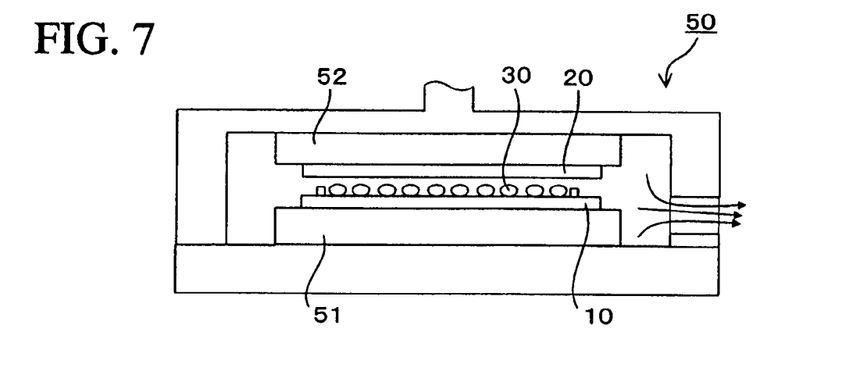
FIG. 7 is an illustration (4) showing the method of manufacturing a liquid crystal display apparatus according to the first embodiment of the present invention.

Then, as shown in FIG. 7, a chamber of the bonding apparatus 50 is evacuated so that a vacuum is produced in the chamber. Then, a camera (not shown) is used to align the upper opposite substrate 20 with the lower TFT substrate 10. Alignment of the substrates 10 and 20 takes place using register marks disposed on the substrates 10 and 20.

Figure 8:
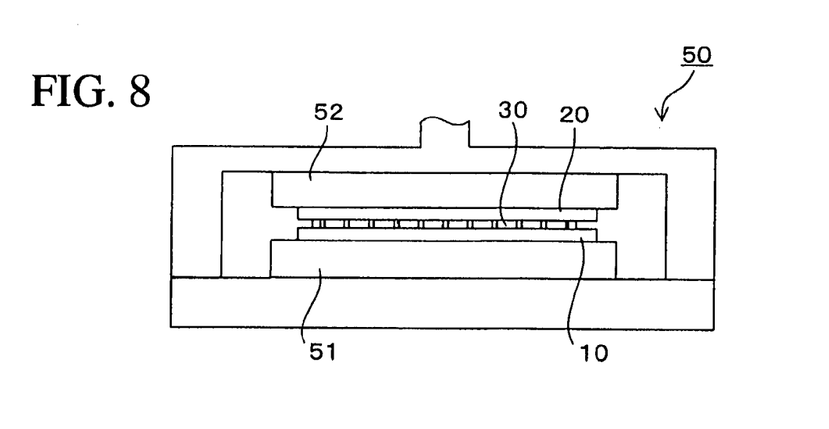
FIG. 8 is an illustration (5) showing the method of manufacturing a liquid crystal display apparatus according to the first embodiment of the present invention.

Then, as shown in FIG. 8, the platens 51 and 52 are brought close to each other so that the substrates 10 and 20 are prebonded with the sealant. Thus, the liquid crystals 30 spread through the area within the seal 18, so that the liquid crystals 30 are hermetically sealed in space enclosed with the substrates 10 and 20 and the seal 18.

Figure 9:
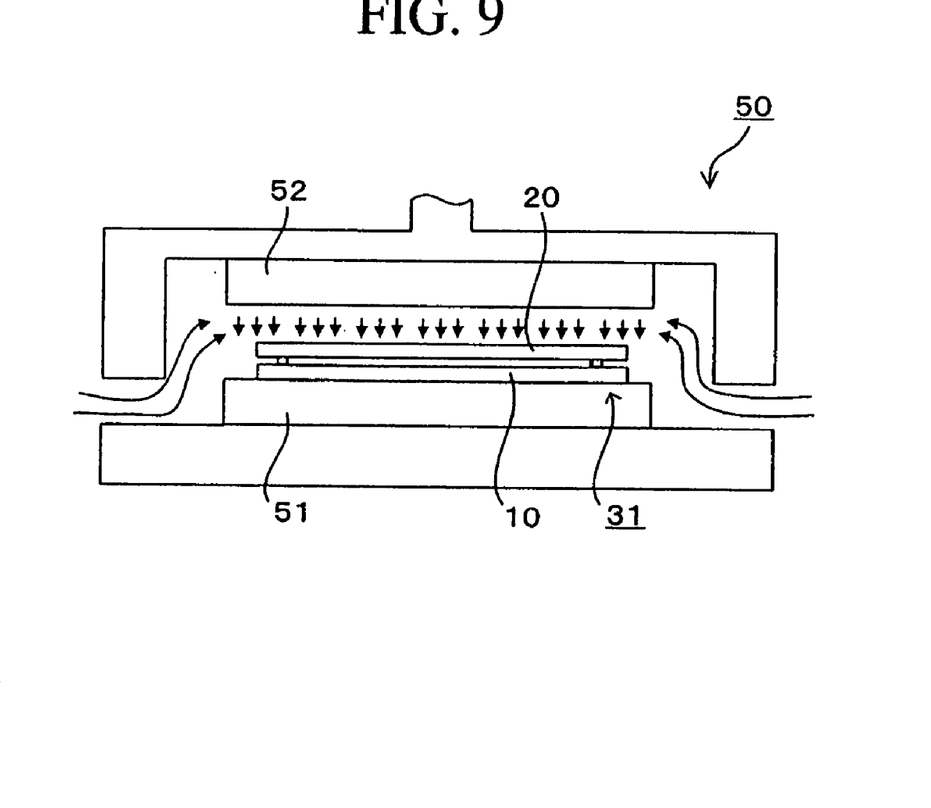
FIG. 9 is an illustration (6) showing the method of manufacturing a liquid crystal display apparatus according to the first embodiment of the present invention.

Then, as shown in FIG. 9, air is introduced into the chamber of the bonding apparatus 50 so that atmospheric pressure is formed in the chamber. Thus, the upper opposite substrate 20 is pressed against the lower TFT substrate 10 under the atmospheric pressure, so that a given cell gap determined by the spacer is maintained between the substrates 10 and 20. A structure formed of the substrates 10 and 20 bonded to each other will be hereinafter called a "liquid crystal cell 31".

Figure 10:
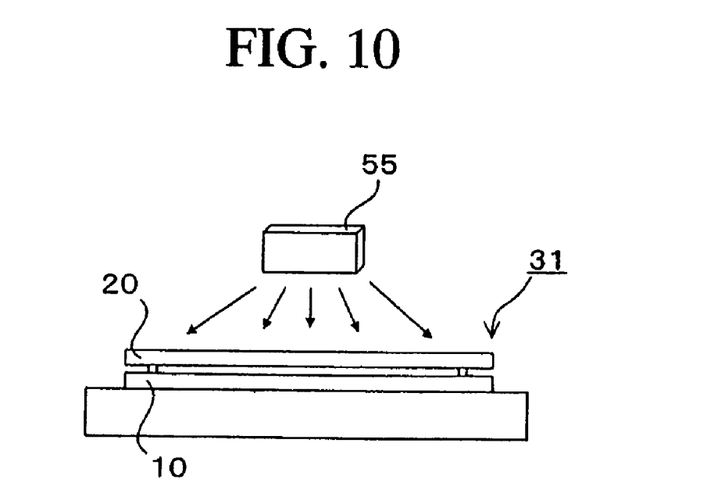
FIG. 10 is an illustration (7) showing the method of manufacturing a liquid crystal display apparatus according to the first embodiment of the present invention.

Then, the liquid crystal cell 31 is removed from the bonding apparatus 50, and the cell 31 is irradiated with light emitted from an ultraviolet lamp 55 so that the sealant is cured, as shown in FIG. 10. Then, the liquid crystal cell 31 is sandwiched in between a pair of polarizing plates. The liquid crystal display apparatus is formed in the above-described manner.

As described above, the first embodiment includes the step of putting drops of liquid crystal onto the substrate, which involves the putting of drops of liquid crystal onto the substrate at spaced intervals of 15 mm. Thus, the impurity concentration is made equal to or less than 30 ppm in the region in which the liquid crystals collide with each other when the step of bonding the substrates causes diffusion of the liquid crystals. Therefore, unevenness in brightness does not appear in a grid pattern on the display screen when the liquid crystal display apparatus is driven.

In the first embodiment, drops of liquid crystal 30 are put onto the substrate at spaced intervals of 15 mm. However, the interval can be appropriately adjusted to fall within 15 mm. Spaced intervals at which drops of liquid crystal 30 are put onto the substrate may be adjusted according to the amount of impurities on the substrate, the manufacturing conditions for the liquid crystal display apparatus, and so on.

Furthermore, in the first embodiment, drops of liquid crystal 30 are put onto the TFT substrate 10. However, drops of liquid crystal 30 may be put onto the opposite substrate 20.

In addition, in the first embodiment, the precision dispenser 42 dispenses the same amount of liquid crystal 30 every time. However, the precision dispenser 42 may dispense variable amounts of liquid crystal 30 as appropriate.

Second Embodiment

A second embodiment of the present invention will be described below.

A manufacturing method of the second embodiment is different in the step of putting drops of liquid crystal onto the substrate from that of the first embodiment. The description of the other steps is omitted because the other steps of the second embodiment are the same as those of the first embodiment.

In the first embodiment, drops of liquid crystal are put onto the substrate at spaced intervals of 15 mm or less. However, a reduction in spaced intervals at which drops of liquid crystal are put onto the substrate may cause an increase in the number of putting drops of liquid crystal onto the substrate, thus causing an increase in the processing time. For example, the number of putting drops of liquid crystal onto the substrate at spaced intervals of 15 mm is 4 times the number of putting drops at spaced intervals of 30 mm.

In the first embodiment, the amount of liquid crystal fed at a time is set to 0.5 mg. Generally, the precision dispenser which dispenses a smaller amount of liquid crystal at a time has greater difficulty in performing precise control on the amount of liquid crystal dispensed. In particular when the amount of liquid crystal dispensed at a time is less than 1.0 mg, the amount of liquid crystal dispensed may vary each time the dispenser dispenses liquid crystal. Thus, variations may occur in the amount of liquid crystal, the drops of which are put onto the substrate. As mentioned above, the number of putting drops of liquid crystal onto the substrate at spaced intervals of 30 mm is reduced to one quarter that of the first embodiment, thus increasing the amount of liquid crystal fed at a time to 2.0 mg.

Thus, the inventors of this application have designed a liquid crystal dripping apparatus which can simultaneously put drops of liquid crystal onto the substrate on a plurality of spots through a single dispensing operation and can also easily control the amount of liquid crystal dispensed.

Figure 11:
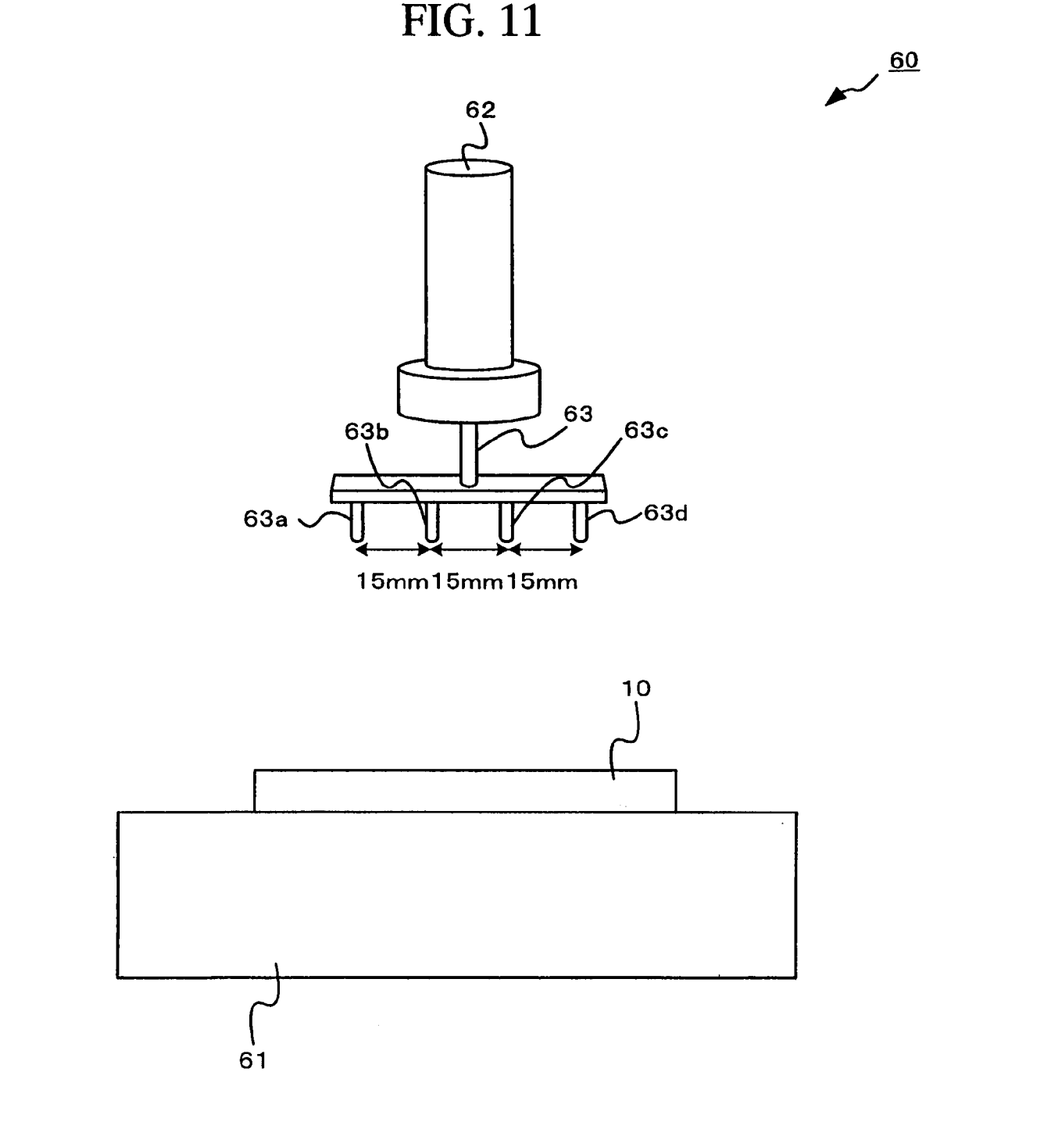
FIG. 11 is a schematic illustration showing the configuration of a liquid crystal dripping apparatus according to a second embodiment of the present invention.

FIG. 11 illustrates the configuration of a liquid crystal dripping apparatus according to the second embodiment of the present invention.

As shown in FIG. 11, a liquid crystal dripping apparatus 60 of the second embodiment has a basic configuration including a stage 61 on which the substrate 10 is placed, a precision dispenser 62 which is disposed over the stage 61 and is filled with the liquid crystal 30, and a branch nozzle 63 mounted to the bottom of the precision dispenser 62. The branch nozzle 63 has four discharge openings 63a to 63d on its end so that the liquid crystal 30 is discharged through each of the discharge openings 63a to 63d. The discharge openings 63a to 63d are arranged in line at spaced intervals of 15 mm. The discharge openings 63a to 63d have the same inside diameter. The inside diameters of the discharge openings 63a to 63d are each equivalent to 0.5, for example, provided that the inside diameter of the branch nozzle 63 which extends from the precision dispenser 62 until diverging into the discharge openings 63a to 63d is taken as 1.

The precision dispenser 62 can control operations, such as the adjustment of the amount of liquid crystal 30 dispensed, and the change of spots on the substrate 10 on the stage 61, onto which drops of liquid crystal 30 are put.

In the method of manufacturing a liquid crystal display apparatus according to the second embodiment, the liquid crystal dripping apparatus 60 is used in the step of putting drops of liquid crystal onto the substrate.

Figure 12:
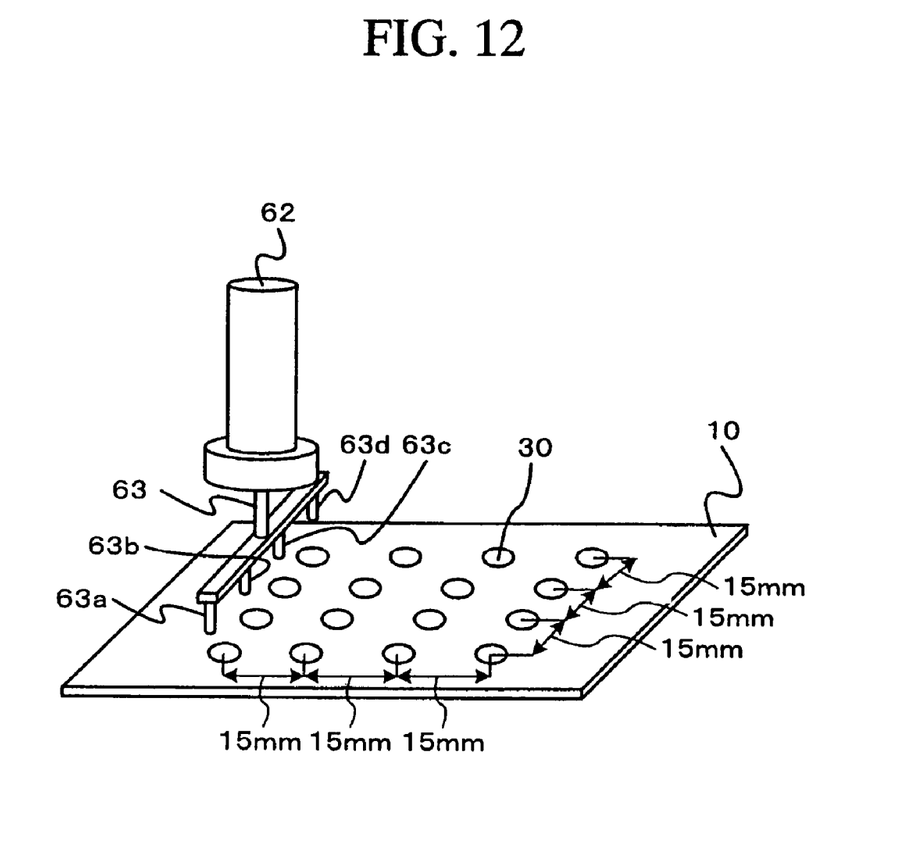
FIG. 12 is an illustration showing a method of manufacturing a liquid crystal display apparatus (the step of putting drops of liquid crystal onto a substrate) according to the second embodiment of the present invention, illustrating the arrangement of drops of liquid crystals put onto the substrate.

The step of putting drops of liquid crystal onto the substrate takes place in the following manner. As shown in FIG. 11, the TFT substrate 10 is first placed on the stage 61 of the liquid crystal dripping apparatus 60. Then, the precision dispenser 62 is controlled to dispense, through the branch nozzle 63, 2.0 mg of liquid crystal 30 onto the TFT substrate 10 within the area having the seal 18 formed thereon. In this instance, 0.5 mg of liquid crystal 30 is simultaneously discharged through each of the discharge openings 63a to 63d so that drops of liquid crystal 30 are put onto the TFT substrate 10 on four spots in line (e.g. four spots in the vertical direction of the surface of the TFT substrate 10). After the completion of a single dispensing operation, the precision dispenser 62 is controlled to travel a distance of 15 mm in the transverse direction (i.e. the horizontal direction of the surface of the TFT substrate 10) and thus to move to another drop-feed point, at which the precision dispenser 62 again dispenses 2.0 mg of liquid crystal 30. After the completion of feeding in the transverse direction, the precision dispenser 62 is controlled to travel a distance of 60 mm in the longitudinal direction (i.e. the vertical direction of the surface of the TFT substrate 10) and thus to move to another drop-feed point. Then, the precision dispenser 62 again puts drops of liquid crystal onto the TFT substrate 10 in the transverse direction. Repetition of the above-mentioned operation yields the TFT substrate 10 having the liquid crystals 30 arranged thereon in a grid pattern at spaced intervals of 15 mm as shown in FIG. 12, as in the case of the arrangement of the liquid crystals 30 shown in FIG. 5B. Incidentally, the seal 18 is not shown in FIG. 12.

As described above, the method of the second embodiment includes the step of putting drops of liquid crystal onto the substrate, which involves the putting of drops of liquid crystal onto the substrate at spaced intervals of 15 mm, as in the case of the method of the first embodiment. Thus, the impurity concentration is made equal to or less than 30 ppm in the region in which the liquid crystals collide with each other when the step of bonding the substrates causes diffusion of the liquid crystals. Therefore, unevenness in brightness does not appear in a grid pattern on the display screen when the liquid crystal display apparatus is driven.

Furthermore, in the second embodiment, a single dispensing operation allows simultaneous discharge of liquid crystals 30 through the four discharge openings 63a to 63d. Thus, the second embodiment can reduce the number of putting a drop of liquid crystal 30 onto the substrate, thereby reducing the processing time required for the step of putting drops of liquid crystal onto the substrate, as compared to the first embodiment.

In addition, the second embodiment does not control the amount of liquid crystal discharged through each of the discharge openings 63a to 63d of the branch nozzle 63 but controls only the amount dispensed by the precision dispenser 62 as in the case of the first embodiment. In the second embodiment, the amount of liquid crystal dispensed at a time by the precision dispenser 62 is set to 2.0 mg, which is more than the amount dispensed at a time (i.e. 0.5 mg) by the precision dispenser 42 of the first embodiment. Thus, the second embodiment facilitates controlling the amount of liquid crystal 30 dispensed, as compared to the first embodiment. Moreover, the apparatus of the second embodiment is simpler in configuration than, for example, an apparatus including four precision dispensers, each of which dispenses 0.5 mg of liquid crystal at a time, in order to reduce the number of putting a drop of liquid crystal 30 onto the substrate.

As described above, the second embodiment facilitates implementation of the method of manufacturing a liquid crystal display apparatus according to the present invention, as compared to the first embodiment.

Figure 13:
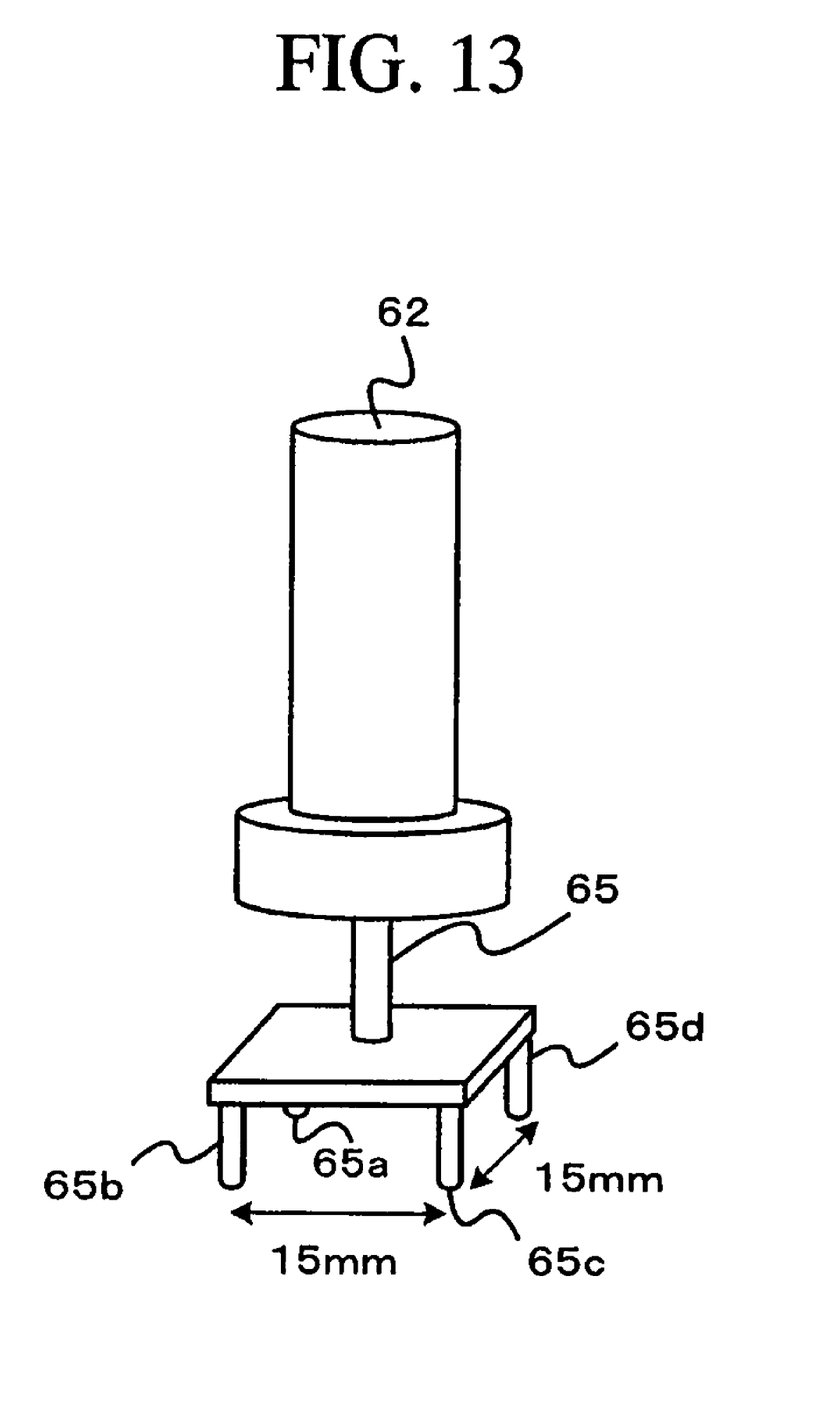
FIG. 13 is a schematic illustration showing the configuration of another liquid crystal dripping apparatus according to the second embodiment.

Note that, in the second embodiment, the branch nozzle 63 includes the four discharge openings 63a to 63d. However, the branch nozzle 63 can include at least two discharge openings. Further, in the second embodiment, the branch nozzle 63 includes the discharge openings 63a to 63d arranged in line at spaced intervals of 15 mm. However, the branch nozzle is not limited to this configuration. For example, a branch nozzle 65 may be configured to include discharge openings 65*a* to 65*d* arranged in a square shape at spaced intervals of 15 mm, as shown in FIG. 13. Alternatively, a branch nozzle may be configured to include a plurality of discharge openings arranged in line or in a square shape at spaced intervals of 15 mm or less.

In the second embodiment, the discharge openings 63*a* to 63*d* of the branch nozzle 63 have the same inside diameter so that the same amount of liquid crystal is discharged through each of the discharge openings 63*a* to 63*d*. However, the discharge openings 63*a* to 63*d* may have various inside diameters so that various amounts of liquid crystal are discharged through each of the discharge openings 63*a* to 63*d*.

By referring to the above-mentioned first and second embodiments, the description has been given with regard to the present invention as applied to the manufacture of an MVA liquid crystal display apparatus. However, the present invention is not limited to the method of manufacturing an MVA liquid crystal display apparatus. The present invention may be applied to the manufacture of various types of liquid crystal display apparatuses such as a VA (vertical alignment) or TN (twisted nematic) liquid crystal display apparatus.

What is claimed is:

1. A method of manufacturing a liquid crystal display apparatus comprising the steps of:

preparing a pair of substrates to form the liquid crystal display apparatus;

putting drops of liquid crystal onto a plurality of spots on one of the substrates which form the pair; and bonding together the one substrate and the other substrate, thereby diffusing the liquid crystals while sealing the liquid crystals in between the pair of substrates, wherein an impurity concentration is made equal to or less than 30 ppm in a region in which the liquid crystals collide with each other when the liquid crystals are diffused, wherein the step of putting drops of liquid crystal onto the substrate includes the adjusting of spaced intervals at which drops of the liquid crystal are put onto the substrate, in such a manner that the following relationship is satisfied:

$$(A*B*c)/r*(A+B-r) \leqq 30 \quad \text{(ppm)}$$

where A denotes the transverse distance (mm) between neighboring liquid crystals, B denotes the longitudinal distance (mm) between neighboring liquid crystals, c denotes the impurity concentration (ppm) of impurities which adhere to the substrate yet to be bonded, and r denotes the width (mm) of unevenness in brightness.

2. A method of manufacturing a liquid crystal display apparatus according to claim 1, wherein the step of putting drops of liquid crystal onto the substrate includes the putting of drops of the liquid crystal onto the substrate at spaced intervals of 15 mm or less.

3. A method of manufacturing a liquid crystal display apparatus according to claim 1, wherein the step of putting drops of liquid crystal onto the substrate includes the simultaneous putting of drops of the liquid crystal onto two or more of the plurality of spots.

* * * * *